United States Patent
Howell et al.

(10) Patent No.: US 10,077,850 B2
(45) Date of Patent: Sep. 18, 2018

(54) REVERSE TAPER PISTON FOR PNEUMATIC ACTUATORS

(71) Applicant: BorgWarner Inc., Auburn Hills, MI (US)

(72) Inventors: Ryan Thomas Howell, Hendersonville, NC (US); Brian Edward Handlon, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 30 days.

(21) Appl. No.: 15/144,891

(22) Filed: May 3, 2016

(65) Prior Publication Data

US 2017/0321819 A1 Nov. 9, 2017

(51) Int. Cl.
| | |
|---|---|
| *F16K 31/12* | (2006.01) |
| *F15B 15/10* | (2006.01) |
| *F15B 15/14* | (2006.01) |
| *F16K 7/17* | (2006.01) |
| *F02B 37/18* | (2006.01) |
| *F16J 3/00* | (2006.01) |
| *F16K 31/126* | (2006.01) |
| *F16K 31/122* | (2006.01) |

(52) U.S. Cl.
CPC ........ *F16K 31/1262* (2013.01); *F02B 37/186* (2013.01); *F15B 15/10* (2013.01); *F15B 15/1447* (2013.01); *F16K 7/17* (2013.01); *F16K 31/1221* (2013.01); *F16J 3/00* (2013.01)

(58) Field of Classification Search
USPC .................................................. 251/61–61.5
See application file for complete search history.

(56) References Cited

U.S. PATENT DOCUMENTS

| | | | | |
|---|---|---|---|---|
| 2,811,167 | A | * 10/1957 | Bott | ........................ F16K 31/34 137/414 |
| 2,942,624 | A | 6/1960 | Good | |
| 2,950,739 | A | * 8/1960 | Lofink | ........................ F16J 3/06 92/6 D |
| 4,121,619 | A | 10/1978 | Pauliukonis | |
| 4,505,188 | A | * 3/1985 | Weydt | ........................ F15B 15/10 267/179 |
| 4,941,510 | A | 7/1990 | Fauck et al. | |

(Continued)

FOREIGN PATENT DOCUMENTS

| | | |
|---|---|---|
| CN | 201963913 U | 9/2011 |
| DE | 3244928 A1 | 6/1984 |

(Continued)

OTHER PUBLICATIONS

International Search Report and Written Opinion; dated Sep. 1, 2017; for International Application No. PCT/US2017/029524; 11 pages.

*Primary Examiner* — Marina Tietjen
*Assistant Examiner* — Daphne M Barry
(74) *Attorney, Agent, or Firm* — BrooksGroup

(57) ABSTRACT

A product may include a canister and a diaphragm may separate a control chamber within the canister. A piston may be movable in the canister between a first position and a second position in response to a pressure change in the control chamber. The piston may have a body and a skirt may extend from the body. The skirt may taper inward relative to the body as the skirt extends away from the body.

15 Claims, 3 Drawing Sheets

(56) References Cited

U.S. PATENT DOCUMENTS

| | | |
|---|---|---|
| 5,255,711 A | 10/1993 | Reeds |
| 6,886,805 B2 | 5/2005 | McCarty |
| 8,833,074 B2 | 9/2014 | Hayashi et al. |
| 9,016,255 B2 | 4/2015 | Cleeves et al. |
| 2015/0233283 A1 | 8/2015 | Smiljanovski et al. |
| 2017/0051765 A1* | 2/2017 | Howell ................. F02B 37/186 |

FOREIGN PATENT DOCUMENTS

| | | |
|---|---|---|
| FR | 667036 A | 10/1929 |
| FR | 2981693 A1 | 4/2013 |
| GB | 2491554 A | 12/2012 |

* cited by examiner

REVERSE TAPER PISTON FOR PNEUMATIC ACTUATORS

TECHNICAL FIELD

The field to which the disclosure generally relates may include actuators and more particularly, may include actuators that include a piston responsive to a control pressure.

BACKGROUND

An actuator may be used to in any number of applications to move an element between multiple positions. Movement between the positions may be effected automatically, such as in response to preprogrammed conditions, or manually, such in response to the desire of an operator.

SUMMARY OF ILLUSTRATIVE VARIATIONS

A number of variations may involve a product that may include a canister. A diaphragm may separate a control chamber within the canister. A piston may be movable in the canister between a first position and a second position in response to a pressure change in the control chamber. The piston may have a body and a skirt may extend from the body. The skirt may taper inward relative to the body as the skirt extends away from the body.

Additional variations may involve a product that may include a canister. The canister may have an interior that may be defined by a perimeter wall and that may extend between a first end and a second end. A piston may have a body that may be oriented substantially perpendicular to the perimeter wall and that may extend across a portion of the interior. The piston body may define a piston perimeter as a part of the piston closest to the perimeter wall. A skirt may extend from the body at the piston perimeter from a proximal edge at the piston perimeter to a terminal edge. The skirt may taper away from the perimeter wall from the proximal edge to the terminal edge. A diaphragm may extend across the interior to the perimeter wall and may separate out a control chamber in the canister.

A number of other variations may involve a method of increasing the position control resolution of a valve plate. A canister may be provided and a piston may be assembled in the canister. An actuator shaft may be provided and may be connected with the valve plate. The actuator shaft may be connected to the piston. The piston may be provided with an outer perimeter. A skirt may be extended from a proximal edge at the outer perimeter to a terminal edge. The terminal edge may be located at a position further from the outer perimeter than the proximal edge and closer to the actuator shaft than the outer perimeter. A diaphragm may be connected across the canister to separate a control chamber in the canister. The piston may move to a first position where the diaphragm may overlie and may contact the skirt to place the valve plate is in a closed position. The piston may be moved to a second position to open the valve to a full open position where the diaphragm may separate from the skirt. A reduced effective area of the piston may be provided when in the first position relative to when in the second position, by forming a trough behind the piston that may be open to the control chamber.

Other illustrative variations within the scope of the invention will become apparent from the detailed description provided herein. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
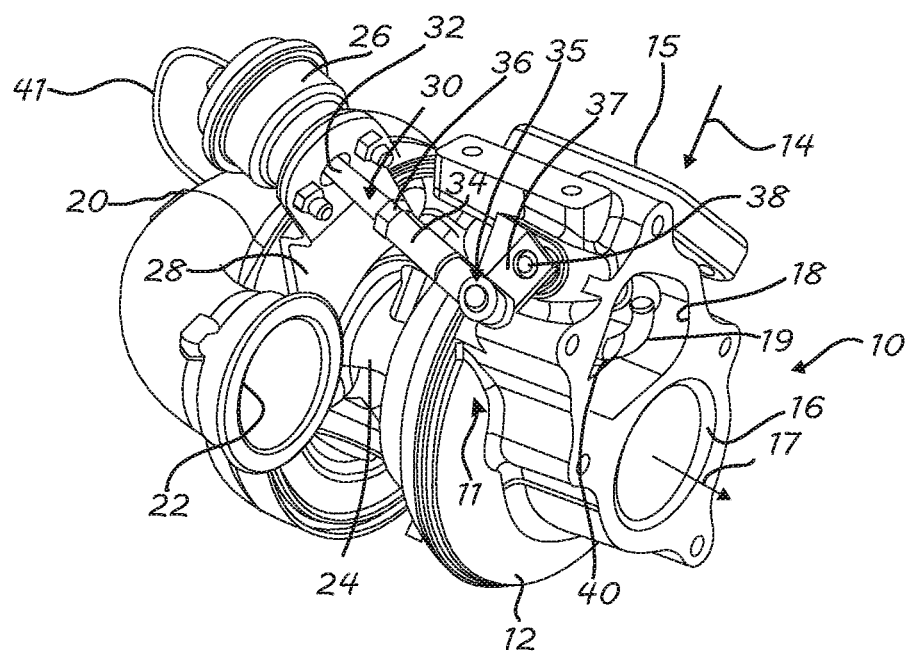
FIG. 1 is a perspective illustration of part of a system according to a number of variations.

Part of a system 10 is illustrated in FIG. 1 according to a number of variations. The system 10 may be a turbocharger system, which is described as an example only. A turbine housing 12 may define an exhaust gas flow circuit for channeling the incoming exhaust gas 14. The exhaust gas 14 may be directed through an inlet 15 and at a turbine wheel inside the turbine housing 12 to induce rotation thereof. A turbine wheel 11 may be disposed inside the turbine housing 12. After being used to impart rotation to the turbine wheel 11, the exhaust gas may then be routed out of the turbine housing 12, through an outlet 16 which directs the outgoing exhaust gas 17 to an exhaust system that may be connected to the turbine housing 12. The inlet 15 may be surrounded by a flange for connection to an incoming exhaust conduit. The turbine housing 12 may also define an alternate exhaust gas flow path from the inlet 15 to another outlet 18, wherein the exhaust gas may bypass the turbine wheel 11. Flow to the outlet 18 may be controlled at a wastegate port by a valve assembly 19 that may be located inside the turbine housing 12. The waste gate port may allow for exhaust gas to bypass the turbine wheel 11 and instead to be delivered directly from the inlet 15 to the outlet 18 so that exhaust gas may flow downstream in the exhaust system. The wastegate port may be opened to allow exhaust gases to bypass the turbine wheel 11 thereby operating as a boost-controlling device. In a number of variations the outlets 16, 18 may not be separated, but instead may be combined in one opening for exhaust gas leaving the turbine housing 12, since both may lead to the same downstream exhaust conduit.

The turbocharger system 10 may also include a compressor housing 20 that may contain a compressor wheel that may be connected to the turbine wheel 11 by a shaft. The compressor housing 20 may be configured to collect air and gases from the compressor wheel and channel them through an outlet 22 and on to an engine intake system that may be connected to the outlet 22. The compressor housing 20 may be mounted to the turbine housing 12 by a central housing 24 that may support the shaft that connects the turbine wheel to the compressor wheel.

An actuator 26 may be mounted near the compressor housing 20, such as on a bracket 28. In other variations the actuator 26 may be bolted to the central housing 24 or the turbine housing 12, depending on the configuration. The actuator 26 may be operated through any of a number of mechanisms such as in response to a control pressure or other power sources. The bracket 28 may be connected to the central housing 24 or to the compressor housing 20. An actuator shaft 30 may extend from the actuator 26 toward the turbine housing 12. The actuator shaft 30 may include a first segment 32 and a second segment 34, with its length adjustable with a nut 36 to lock the length. The actuator shaft 30 may include an end opposite the actuator 26, with an opening through which a pin may extend forming a joint 35. The pin may be connected to a lever 37, which may be connected to a rotatable shaft 38. The shaft 38 may extend into the turbine housing 12 and may be connected to a valve plate 40 (shown in FIG. 2), of the valve assembly 19. As a result, translation of the actuator shaft 30 by the actuator 26 may rotate the lever 37 through the joint 35, thereby rotating the shaft 38 and the valve plate 40 to selectively open and close the wastegate port. The actuator may be connected with the compressor outlet 22 through a conduit, which may be a tube 41 for a supply of a control pressure to the actuator 26. In other variations the actuator may be connected with an external power source for control purposes.

Figure 2:
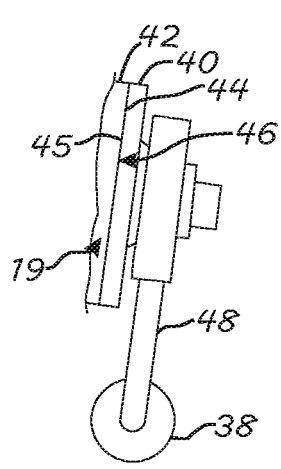
FIG. 2 is a schematic illustration of a valve area of the system of FIG. 1 with the valve closed according to a number of variations.
Figure 3:
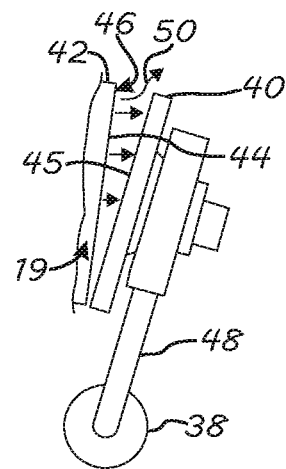
FIG. 3 is a schematic illustration a valve area of the system of FIG. 1 with the valve open according to a number of variations.
Figure 4:
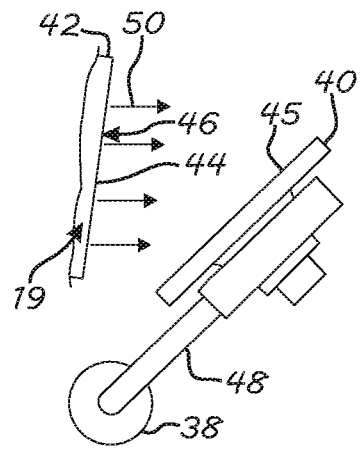
FIG. 4 is a schematic illustration a valve area of the system of FIG. 1 with the valve open according to a number of variations.

Referring to FIG. 2 the valve assembly 19 area is illustrated according to a number of variations, in a closed position. A section 42 of the turbine housing 12 may extend to a terminal surface 44. The wastegate port 46 may be part of the exhaust gas bypass around the turbine wheel 11. The valve assembly 19 may include the valve plate 40, which may have a face 45 that may mate with the terminal surface 44 as shown in FIG. 2 to close the wastegate port 46. The valve plate 40 may be carried by an arm 48, which may be connected with the shaft 38. The valve plate 46 may pivot relative to the housing section 42 for seating of the face 45 on the terminal surface 44, which closes the wastegate port 46 and shuts off flow there-through. As shown in FIG. 3, the shaft 38 may be rotated by the actuator 26 to modulate the wastegate port 46 in an open condition. As the valve plate 40 is positioned by the actuator 26 close to the terminal surface 44 flow 50 exiting the wastegate port 46 acts on the valve plate 40. Flow 50 through the wastegate port 50 may increase rapidly as the valve plate 40 moves off the terminal surface 44. It has been found that control of the flow 50, and the resolution level of that control, at and near the closed position of the wastegate port 46, may be challenging. Movement of the valve plate 40 under these conditions requires positioning with the valve plate 40 under the influence of the flow 50. As the shaft 38 rotates when the valve plate 40 is further removed from the terminal surface 44 as shown in FIG. 4, the influence of the flow 50 on the valve plate 40 may be less significant to positioning control and resolution.

Figure 5:
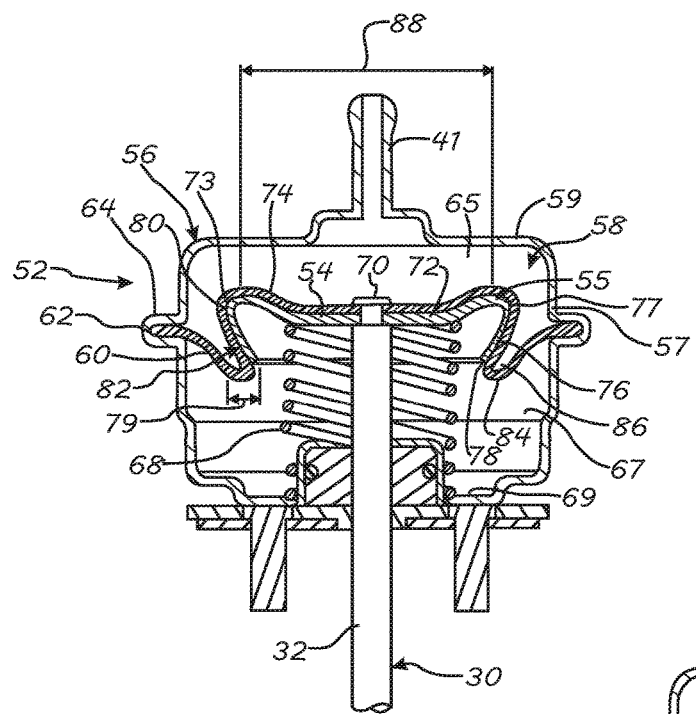
FIG. 5 is a schematic sectional illustration of an actuator in a first position according to a number of variations.

In a number of variations as illustrated in FIG. 5, a product 52 is shown, which may be used as the actuator 46. The product 52 may include a piston 54, which may be attached to the first segment 32 of the actuator shaft 30. In FIG. 2, the piston 54 may be located in a nominal position 55 that may correspond to closure of the wastegate port 46. The piston 54 may be located in a canister 56, which may be sealed to close its interior 58. The canister 56 may have a perimeter wall 57 extending between an end 59 and an end 69. A diaphragm 60 may be a resilient flexible member and may have a perimeter 62 connected to the canister 56 around the perimeter wall 57 and extending across the interior 58 to separate out two chambers. For example, the perimeter 62 may be captured in the crimp 64 where two halves of the canister 56 are connected. As a result, the interior 58 may be separated into a control chamber 65 and a reaction chamber 67 by the diaphragm 60. The control chamber may be connected with a control pressure source such as through the conduit 41. The reaction chamber 67 may be closed or vented, such as depending on the operating pressure level in the control chamber 65, and whether the reaction chamber 67 is used to move the piston 54 to the nominal position 55. In a number of variations a spring 68 may be positioned in the reaction chamber 67 extending between the piston 54 and the end 69 of the canister 56 to urge the piston to the nominal position 55.

In a number of variations the piston 54 may be connected to the end 70 of the actuator shaft 30. The piston 54 may have a body 72 around the end 70, which may be disk-like. The body 72 may be shaped to fit the shape of the canister 56. For example, with a cylindrical canister, the body 72 may be annular in shape, while in other shaped canisters the body 72 may take other appropriate shapes similar to that of the canister. The body 72 may be planar or may have a varying profile such as by including a raised perimeter 73 surrounding a center area 74, which may impart added rigidity. The piston may have a skirt 76, which may depend from the perimeter 73, extending toward the end 69. The skirt 76 may take the form of a ring that has a proximal edge 77 that may be connected to, or integrally formed with, the perimeter 73. The skirt 76 may include a distal, terminal edge 78 positioned away from the body 72. The skirt 76 may taper or slope toward the actuator shaft 30 from the proximal edge 77 to the terminal edge 78. The taper may result in the terminal edge 78 being positioned under the body 72 a distance 79 from the outer edge 80 of the perimeter 73. The skirt 76 may be continuous around the actuator shaft 30, or may be interrupted with gaps or a varying profile.

In a number of variations, the diaphragm 60 may overly the body 72. The diaphragm 60 may be connected to the end 70 of the actuator shaft 30, or may be free at its center. When the piston is in the nominal position 55, the diaphragm 60 may also overly the skirt 76 contacting the skirt 76 and following its profile. For example, the diaphragm 55 may contact the entire outboard surface 82 of the skirt 76 from the proximal edge 77 to the terminal edge 78. As a result, between the contact with the skirt 76 and the contact with the canister 56 at its perimeter 62, the diaphragm 55 may form a trough 84 that may extend completely around the piston 54 and may be open to the control chamber 65. The trough 84 may extend under the body 72 so that pressure in the control chamber 65 may enter the trough 84 in the space 86 under the piston 54. As a result, pressure in the space 86 reduces the effective area of the piston 54, as represented by reference numeral 88, to less than the area encompassed by the outer edge 80. The distance at 88 may be measured between the inner edges of the space 86 on opposite sides of the piston 54. The effective area may be described as the area over which the control pressure acts on the piston 54, such as to compress the spring 68. In the case of a round shaped piston 54, the effective area may be calculated using $\pi r^2$ where r is one-half the distance at reference numeral 88. The reduced effective area of operation may correspond, for example, to operation of the valve plate 40 around the positions of FIGS. 2 and 3, when position control is most effected by the forces of the flow 50. The reduced effective area may improve the resolution of the actuator 26. With the reduced effective area, the piston 54 may move a smaller distance for a given increment of pressure change in the control chamber 65 than the distance the same increment would effect if the effective area were equal to the entire area of the body 72.

Figure 6:
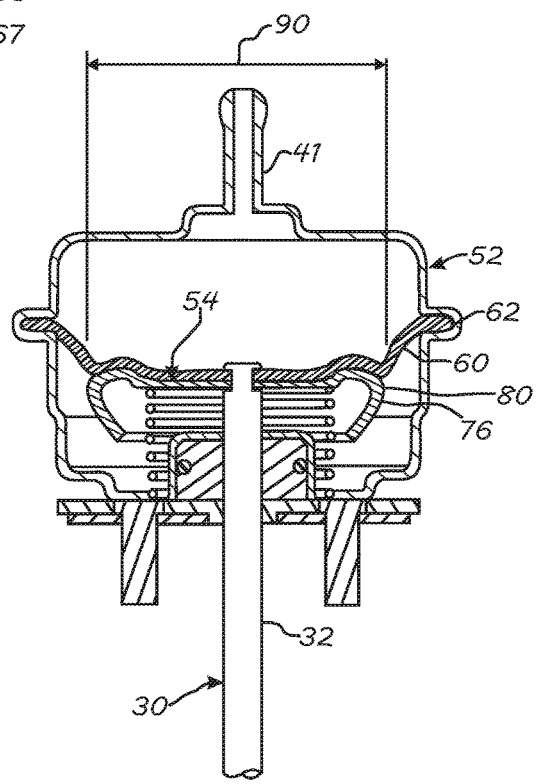
FIG. 6 is a schematic sectional illustration of an actuator in a second position according to a number of variations.

In a number of variation as pressure in the control chamber 65 is increased, the piston 54 may move toward the end 69 and the diaphragm 55 may roll upward along the skirt 76. As the piston 54 moves further toward the end 69, the diaphragm 60 may separate from the skirt 76. With reference to FIG. 6, when the piston 54 is at full stroke, which may correspond to a fully open position of the valve plate 40, such as shown in FIG. 4, the diaphragm 55 may be fully extended. At this position, the effective area approaches or equals the area of the piston 54 itself. As a result, the effective area is greater than the effective area of the product 52 in the nominal position of FIG. 5. The effective area may be determined using the area at reference numeral 90, which may be equivalent to the entire area of the body 72 determined using the distance across the piston 54 at the outer edge 80. With the larger effective area, the piston 54 may move a greater distance for a given increment of pressure change in the control chamber 65 than the distance the same increment would effect using the effective area of the piston 54 in or near the position of FIG. 5. This may be equal to the distance of movement using the entire area of the body 72.

Figure 7:
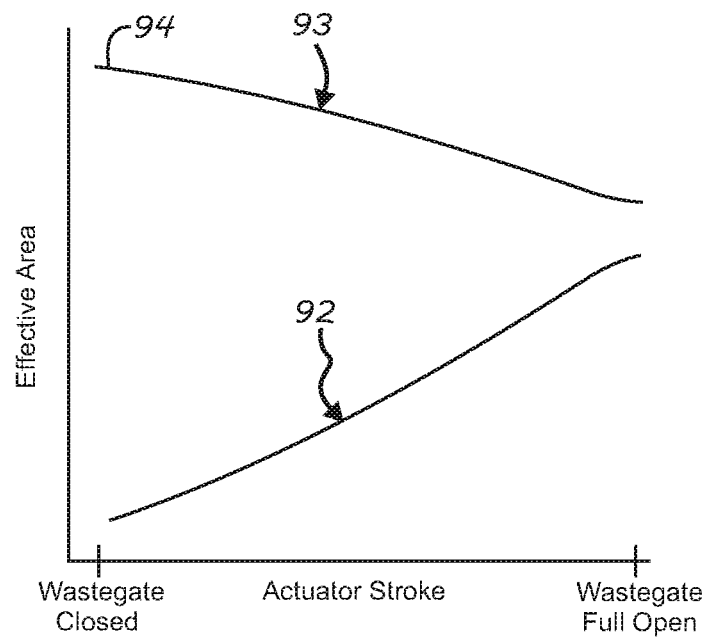
FIG. 7 is a graphical representation of effective area versus actuator stroke with a comparison between an actuator according to a number of variations and another actuator.

With reference to FIG. 7, a graphical representation depicts the relation of effective area of a piston on the vertical axis to stroke of the piston on the horizontal axis. As a reference, for a piston without the tapered skirt 76, the effective area may decrease, or remain substantially constant as the piston strokes, with the largest effective area at the beginning part 94 of the curve 93, when the valve plate 40 (for example) is at or near closed. This provides the lowest resolution when the piston is at or near closed. For the piston 54 with the tapered skirt 76, the effective area increases as the diaphragm 60 unrolls up along the skirt 76 as the piston strokes down to the position of FIG. 6, which corresponds to a full open position of the wastegate valve. The piston 54 provides greater resolution control through a smaller effective area at or near the wastegate valve closed position of FIG. 5. Therefore, curve 92 is achieved through the variations described herein including use of the tapered piston 54, giving better resolution at valve closed, where it is needed most.

Figure 8:
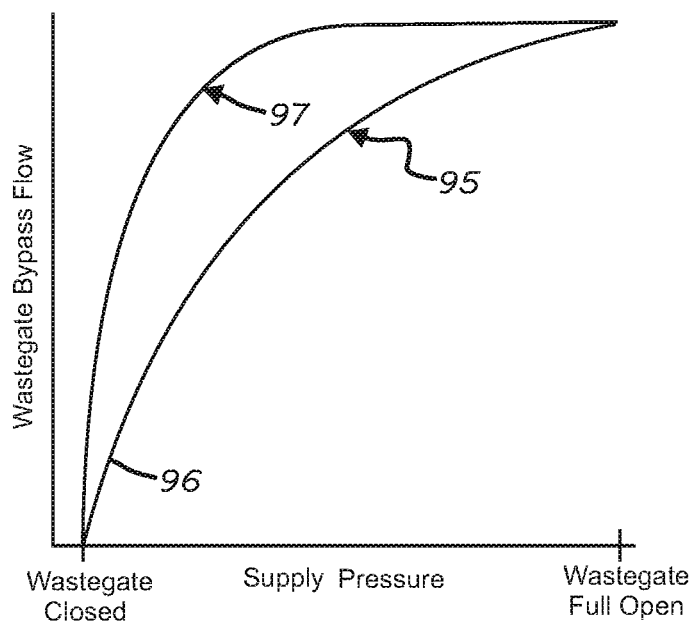
FIG. 8 is a graphical representation of flow versus control pressure with a comparison between an actuator according to a number of variations and another actuator.

With reference to FIG. 8, a graphical representation depicts the relation of flow (such as through the wastegate port 46), on the vertical axis to control pressure on the horizontal axis. For the piston 54 with the skirt 76, bypass flow increases as depicted by the curve 95, may have a lower slope than the curve 97 of a piston without the skirt 76, including in the area 96 adjacent a closed position of the valve plate 40. As a result, a given pressure change in the control chamber 65 result in lower flow change on curve 96 than on curve 97. This provides greater resolution control of the wastegate port 46 through the product 52. Better flow control provides, for example, better performance of the system 10 where the boost provided by the turbocharger better matches the preferred amount of boost based on operating conditions.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a canister. A diaphragm may separate a control chamber within the canister. A piston may be movable in the canister between a first position and a second position in response to a pressure change in the control chamber. The piston may have a body and a skirt may extend from the body. The skirt may taper inward relative to the body as the skirt extends away from the body.

Variation 2 may include the product according to variation 1 wherein the body may have a center and a perimeter around the center. The skirt may extend from the perimeter to a terminal edge away from the body. The terminal edge may be located inward from the perimeter relative to the center.

Variation 3 may include the product according to variation 1 or 2 wherein the first position may correspond to a lower pressure in the control chamber than the second position.

Variation 4 may include the product according to variation 3, wherein when in the first position, the diaphragm may overlie and may contact the skirt.

Variation 5 may include the product according to variation 4, wherein in the second position, the diaphragm may be separated from the skirt.

Variation 6 may include the product according to variation 5 wherein, when in the first position, the diaphragm may form a trough near the terminal edge. The trough may open to the control chamber, which may allow pressure in the control chamber to act on an opposite side of the piston from the control chamber. This may reduce an effective area of the piston on which the pressure acts to force the piston in a direction from the first position to the second position.

Variation 7 may include the product according to variation 5 wherein the diaphragm may overlie and contacts the body in both the first and second positions.

Variation 8 may include the product according to variation 5, wherein when in the second position, the trough may be eliminated and the effective area of the piston may be greater than when in the first position as a result.

Variation 9 may include the product according to variation 1 and may include a conduit open to the control chamber to supply a control pressure thereto. An actuator shaft may extend from the piston and out of the canister. A valve plate may be connected to the actuator shaft and may move in response to a change in pressure in the conduit. The change in pressure may be affected by repositioning of the valve plate. The valve plate may move a greater distance for a given pressure change in the conduit when the piston is near the second position as compared to when the piston is at the first position.

Variation 10 may include the product according to variation 9 wherein the body may have a center that may be connected to the actuator shaft. The body may have a perimeter around the center. The skirt may extend from the perimeter to a terminal edge away from the body. The terminal edge may be located closer to the actuator shaft than to the perimeter.

Variation 11 may include the product according to variation 10 wherein the actuator shaft may extend from the body in a first direction. The skirt may also extend from the body in the first direction but angled toward the actuator shaft completely around the piston in the shape of a tapered ring.

Variation 12 may involve a product that may include a canister. The canister may have an interior that may be defined by a perimeter wall and that may extend between a first end and a second end. A piston may have a body that may be oriented substantially perpendicular to the perimeter wall and that may extend across a portion of the interior. The piston body may define a piston perimeter as a part of the piston closest to the perimeter wall. A skirt may extend from the body at the piston perimeter from a proximal edge at the piston perimeter to a terminal edge. The skirt may taper away from the perimeter wall from the proximal edge to the terminal edge. A diaphragm may extend across the interior to the perimeter wall and may separate out a control chamber in the canister.

Variation 13 may include the product according to variation 12 wherein the piston may move between a range of positions that may include a first position nearer the first end than the second end and a second position nearer the second end than the first end. When in the first position, the diaphragm may overlie and may contact the skirt, and may form a trough near the terminal edge. The trough may be open to the control chamber, which may allow pressure in the control chamber to act on an opposite side of the piston from the first end. This may reduce an effective area of the piston on which the pressure may act to force the piston in a direction from the first position to the second position.

Variation 14 may include the product according to variation 13 wherein the skirt may have an outer surface that may face the perimeter wall. When in the first position, the diaphragm may contact the entire outer surface from the proximal edge to the terminal edge.

Variation 15 may involve a method of increasing the position control resolution of a valve plate. A canister may be provided and a piston may be assembled in the canister. An actuator shaft may be provided and may be connected with the valve plate. The actuator shaft may be connected to the piston. The piston may be provided with an outer perimeter. A skirt may be extended from a proximal edge at the outer perimeter to a terminal edge. The terminal edge may be located at a position further from the outer perimeter than the proximal edge and closer to the actuator shaft than the outer perimeter. A diaphragm may be connected across the canister to separate a control chamber in the canister. The piston may move to a first position where the diaphragm may overlie and may contact the skirt to place the valve plate is in a closed position. The piston may be moved to a second position to open the valve to a full open position where the diaphragm may separate from the skirt. A reduced effective area of the piston may be provided when in the first position relative to when in the second position, by forming a trough behind the piston that may be open to the control chamber.

The above description of select variations within the scope of the invention is merely illustrative in nature and, thus, variations or variants thereof are not to be regarded as a departure from the spirit and scope of the invention.

What is claimed is:

1. A product comprising a canister, a diaphragm separating a control chamber within the canister, a piston movable in the canister between a first position and a second position in response to a pressure change in the control chamber, the piston has a body and a skirt extending from the body, the skirt tapering inward relative to the body as the skirt extends away from the body, a conduit open to the control chamber to supply a control pressure thereto, an actuator shaft extending from the piston and out of the canister, a valve plate connected to the actuator shaft;

wherein the body has a center connected to the actuator shaft and a perimeter around the center, the skirt extends from the perimeter to a terminal edge away from the body, the terminal edge located closer to the actuator shaft than the perimeter; and, wherein the actuator shaft extends from the body in a first direction and the skirt also extends from the body in the first direction but angled toward the actuator shaft.

2. The product according to claim 1 wherein the body has a center and a perimeter around the center, the skirt extends from the perimeter to a terminal edge away from the body, the terminal edge located inward from the perimeter relative to the center.

3. The product according to claim 1 wherein the first position corresponds to a lower pressure in the control chamber than the second position.

4. The product according to claim 3, wherein when in the first position, the diaphragm overlies and contacts the skirt.

5. The product according to claim 4, wherein in the second position, the diaphragm is separated from the skirt.

6. The product according to claim 5 wherein, when in the first position, the diaphragm forms a trough near the terminal edge, the trough open to the control chamber allowing pressure in the control chamber to act on an opposite side of the piston from the control chamber thereby reducing an effective area of the piston on which the pressure acts to force the piston in a direction from the first position to the second position.

7. The product according to claim 5 wherein the diaphragm overlies and contacts the body in both the first and second positions.

8. The product according to claim 5, wherein when in the second position the trough is eliminated and the effective area of the piston is greater than when in the first position as a result.

9. The product according to claim 1 comprising the valve plate connected to the actuator shaft moving in response to a change in pressure in the conduit, the change in pressure affected by repositioning of the valve plate, the valve plate moving a greater distance for a given pressure change in the conduit when the piston is near the second position as compared to when the piston is at the first position.

10. The product according to claim 9 wherein the body has a center connected to the actuator shaft and a perimeter around the center, the skirt extends from the perimeter to a terminal edge away from the body, the terminal edge located closer to the actuator shaft than the perimeter.

11. The product according to claim 1 wherein the actuator shaft extends from the body in a first direction and the skirt also extends from the body in the first direction but angled toward the actuator shaft completely around the piston in the shape of a tapered ring.

12. A product comprising a canister with an interior defined by a perimeter wall extending between a first end and a second end, a piston that has a body oriented substantially perpendicular to the perimeter wall and extending across a portion of the interior, the piston body defining a piston perimeter as a part of the piston closest to the perimeter wall, a skirt extending from the body at the piston perimeter from a proximal edge at the piston perimeter to a terminal edge, the skirt tapering away from the perimeter wall from the proximal edge to the terminal edge as it extends away from the body, and a diaphragm extending across the interior to the perimeter wall and separating out a control chamber in the canister;

an actuator shaft extending from the piston and out of the canister, a valve plate connected to the actuator shaft;

wherein the body has a center connected to the actuator shaft and the terminal edge of the skirt is located closer to the actuator shaft than the piston perimeter; and, wherein the actuator shaft extends from the body in a first direction and the skirt also extends from the body in the first direction but angled toward the actuator shaft.

13. The product according to claim 12 wherein the piston moves between a range of positions including a first position nearer the first end than the second end and a second position nearer the second end than the first end, wherein, when in the first position, the diaphragm overlies and contacts the skirt and forms a trough near the terminal edge, the trough open to the control chamber allowing pressure in the control chamber to act on an opposite side of the piston from the first end thereby reducing an effective area of the piston on which the pressure may act, to force the piston in a direction from the first position to the second position.

14. The product according to claim 13 wherein the skirt has an outer surface facing the perimeter wall and when in the first position, the diaphragm contacts the entire outer surface from the proximal edge to the terminal edge.

15. A method of increasing the position control resolution of a valve plate comprising: providing a canister; assembling a piston in the canister; providing an actuator shaft connected with the valve plate, connecting the actuator shaft to the piston; providing the piston with an outer perimeter; extending a skirt from a proximal edge at the outer perimeter to a terminal edge, locating the terminal edge at a position further from the outer perimeter than the proximal edge and closer to the actuator shaft than the outer perimeter; connecting a diaphragm across the canister to separate a control chamber in the canister; moving the piston to a first position where the diaphragm overlies and contacts the skirt to place the valve plate is in a closed position; and moving the piston to a second position to open the valve to a full open position where the diaphragm separates from the skirt; and providing a reduced effective area of the piston when in the first position relative to when in the second position, by forming a trough behind the piston that is open to the control chamber.

* * * * *